United States Patent
Mueller et al.

(10) Patent No.: US 11,248,320 B2
(45) Date of Patent: *Feb. 15, 2022

(54) SPACING KNITTED FABRIC AND METHOD FOR PRODUCING A SPACING KNITTED FABRIC

(71) Applicant: MUELLER TEXTIL GMBH, Wiehl-Drabenderhoehe (DE)

(72) Inventors: Frank Mueller, Wiehl (DE); Stefan Mueller, Wiehl (DE)

(73) Assignee: MUELLER TEXTIL GMBH, Wiehl-Drabenderhoehe (DE)

( * ) Notice: Subject to any disclaimer, the term of this patent is extended or adjusted under 35 U.S.C. 154(b) by 216 days.

This patent is subject to a terminal disclaimer.

(21) Appl. No.: 15/126,675

(22) PCT Filed: Mar. 19, 2015

(86) PCT No.: PCT/EP2015/055815
§ 371 (c)(1),
(2) Date: Sep. 16, 2016

(87) PCT Pub. No.: WO2015/140259
PCT Pub. Date: Sep. 24, 2015

(65) Prior Publication Data
US 2017/0088987 A1     Mar. 30, 2017

(30) Foreign Application Priority Data
Mar. 20, 2014   (DE) .................. 102014103861.4

(51) Int. Cl.
*D04B 21/12*     (2006.01)
*B32B 5/02*     (2006.01)
(Continued)

(52) U.S. Cl.
CPC .............. *D04B 21/12* (2013.01); *B32B 5/026* (2013.01); *B32B 5/06* (2013.01); *B32B 5/26* (2013.01);
(Continued)

(58) Field of Classification Search
CPC ................................ Y10T 442/00; B32B 5/00
See application file for complete search history.

(56) References Cited

U.S. PATENT DOCUMENTS 4,783,355 A * 11/1988 Mueller ................. D03D 15/00
428/373
6,644,070 B2 * 11/2003 Ikenaga ................. D04B 21/16
442/318
(Continued)

FOREIGN PATENT DOCUMENTS

CN       1867279 A    11/2006
DE    14 60 720 A1     3/1970
(Continued)

OTHER PUBLICATIONS

Spencer, David J., "Knitting Technology" chapter 6, copyright 1983, published by Elsevier LTD (Year: 1983).*
(Continued)

*Primary Examiner* — Jennifer A Steele
(74) *Attorney, Agent, or Firm* — Collard & Roe, P.C.

(57) ABSTRACT

A spacing knitted fabric has a first and a second flat knitted fabric layer that are connected to each other by incorporated spacing threads. The first knitted fabric layer has mesh-forming loop threads made from thermoplastic plastic and non-mesh-forming additional threads made of thermoplastic plastic. In the first knitted fabric layer, only the additional threads are at least partially melted and due to the at least partial melting, causing a reinforcement of the first knitted fabric layer.

8 Claims, 3 Drawing Sheets

(51) Int. Cl.
  *B32B 5/26* (2006.01)
  *B32B 5/06* (2006.01)
(52) U.S. Cl.
  CPC ....... *B32B 2250/02* (2013.01); *B32B 2250/20* (2013.01); *B32B 2262/0284* (2013.01); *B32B 2307/724* (2013.01); *B32B 2601/00* (2013.01); *D10B 2331/04* (2013.01); *D10B 2403/0213* (2013.01); *D10B 2403/0241* (2013.01); *D10B 2505/08* (2013.01); *Y02P 70/62* (2015.11)

(56) References Cited

U.S. PATENT DOCUMENTS

| | | | |
|---|---|---|---|
| 7,418,837 | B2 | 9/2008 | Mueller et al. |
| 7,696,110 | B2 * | 4/2010 | Taniguchi ................ A47C 5/00 442/304 |
| 7,779,654 | B2 | 8/2010 | Garus |
| 10,151,054 | B2 * | 12/2018 | Mueller ................ D04B 21/12 |
| 2002/0016119 | A1 | 2/2002 | Orita et al. |
| 2003/0033838 | A1 * | 2/2003 | Ikenaga ................ D04B 21/16 66/196 |
| 2005/0142970 | A1 * | 6/2005 | Taniguchi ................ A47C 5/00 442/189 |
| 2009/0075542 | A1 * | 3/2009 | Cuypers ................ A61F 13/04 442/181 |
| 2014/0209098 | A1 * | 7/2014 | Dunn ................ A61M 16/0683 128/206.21 |

FOREIGN PATENT DOCUMENTS

| | | | |
|---|---|---|---|
| DE | 35 08 864 A1 | 10/1986 | |
| DE | 9016062 | 2/1991 | |
| DE | 19931193 | 1/2001 | |
| DE | 102006004914 | 8/2007 | |
| DE | 102008020287 | 2/2010 | |
| DE | 102009013253 | 9/2010 | |
| EP | 0 425 099 A2 | 5/1991 | |
| EP | 1 426 473 A1 | 6/2004 | |
| EP | 1680982 | 7/2006 | |
| EP | 1775362 | 4/2007 | |
| EP | 1860218 | 11/2007 | |
| JP | H11-152663 A | 6/1999 | |
| JP | 2005-344225 | * 12/2005 | ............ A47C 7/02 |
| JP | 2005-344225 A | 12/2005 | |
| JP | 2007-224441 A | 9/2007 | |
| WO | 02/079558 A1 | 10/2002 | |
| WO | WO 2012/139142 | 10/2012 | |

OTHER PUBLICATIONS

Korean Office Action in KR 10-2016-7029263 dated Jan. 30, 2018.
Opinion Korean Patent Office in KR 10-2016-7029263 dated Mar. 30, 2018 with English translation.
Chinese Office Action in CN 201580014945.1 dated Sep. 30, 2017 with English translation.
Japanese Office Action in JP 2016-558025 dated Nov. 8, 2017 with English translation.

* cited by examiner

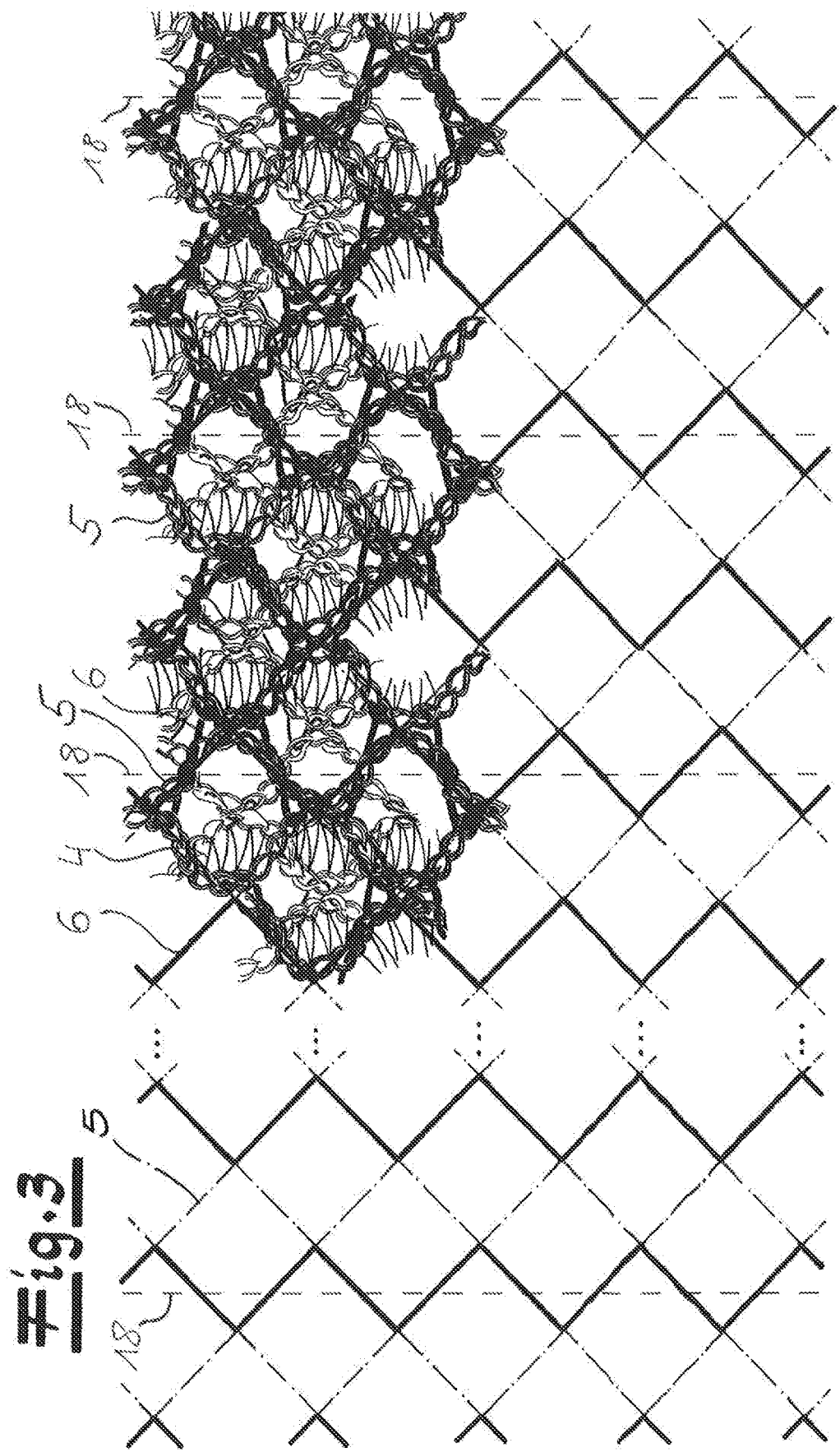

SPACING KNITTED FABRIC AND METHOD FOR PRODUCING A SPACING KNITTED FABRIC

CROSS-REFERENCE TO A RELATED APPLICATION

The invention described and claimed hereinbelow is a National Stage Application of PCT/EP2015/055815, filed on Mar. 19, 2015 (the PCT application), now filed in the United States under 35 USC § 371. The PCT application claims priority from German Patent Application DE 10 2014 103861.4, filed on Mar. 20, 2014. The contents of the PCT application and the German Patent Application are incorporated by reference herein. The PCT application provides the basis for a claim for priority of invention.

BACKGROUND OF THE INVENTION

The invention relates to a spacing knitted fabric comprising a first and a second flat knitted fabric layer which are connected to each other by incorporated spacing threads, wherein the first knitted fabric layer has mesh-forming loop threads made from thermoplastic plastic and non-mesh-forming additional threads made of thermoplastic plastic. The subject matter of the invention also relates to a method for producing the spacing knitted fabric.

Spacing knitted fabrics are characterized by a light, air permeable structure, wherein due to the spacing threads extending between the two knitted fabric layers, spacing knitted fabrics are elastic in their direction of thickness. Due to these properties, spacing knitted fabrics can be provided as a soft, elastic and air-circulation-enabling layers for mattresses, upholstered furniture, items of clothing or shoes. Spacing knitted fabrics are also used in the automotive sector, for example for climate-controlled seats and seat covers, and due to their cushioning properties and their very good resilience behaviour, spacing knitted fabrics enable good fitting to contours. A conventional spacing knitted fabric is known from DE 90 16 062 U1.

Despite the inherently very open, air-permeable structure of a spacing knitted fabric, precisely when using the spacing knitted fabrics for ventilation or air extraction, there is a desire to improve the air permeability between the knitted fabric layers, or the air flow properties.

The application possibilities of spacing knitted fabrics are not limited to the areas of ventilation and/or elastic support, however. For example, it is known from WO 2012/139142 A1 to use spacing knitted fabrics in railway sleepers for connecting a concrete body to a sleeper bed, wherein the spacing knitted fabric in the production of the sleeper body is partly embedded into both the concrete body and the sleeper bed, thus enabling a particularly reliable permanent connection of these two elements. A feature which is also exploited in this application is that spacing knitted fabrics have a relatively open, airy structure while still having high mechanical stability.

A spacing knitted fabric with channels between the knitted fabric layers is disclosed in DE 10 2008 020 287 C5. In order to provide both sufficient compressive strength and stability of the spacing knitted fabric and as far as possible a resistance-free, uniform distribution of air, in the layer formed between the knitted fabric layers by spacing threads the spacing knitted fabric has intersecting channels, running at an angle to the direction of production. The known spacing knitted fabric has proven itself in practice and exploits the fact that the inclined arrangement of the channels prevents an excessive reduction in stability.

EP 1 775 362 A1 discloses a spacing knitted fabric, in which channels running in a direction of production are formed by the fact that in the knitting process with a plurality of parallel guided threads a portion of the spacing threads is omitted, producing open channels extending in the direction of production at these imperfections. The strength of the spacing knitted fabric is sharply reduced in these channels which run in the production direction, however, because the spacing knitted fabric lacks stabilisation there, and also the adjacent areas can only provide a limited contribution to the mechanical stability. Even in the transverse direction a very significant weakening occurs due to the channels, because under pressure applied in the transverse direction to the channels which run in the production direction, they completely collapse due to the mobility of the two knitted fabric layers, or under tension in the transverse direction they can be stretched significantly in width. Due to this, both the functioning of the spacing knitted fabric and its handling during processing are seriously impaired.

Similar restrictions apply when the spacing knitted fabric has channels running transversely, which can be produced, for example, by the spacing threads being guided in the production direction on rows of loops spaced apart from each other in one of the knitted fabric layers, and in order to form a channel no connection being made there between the two knitted fabric layers.

As can also be seen from EP 1 775 362 A1, in the case of spacing knitted fabrics known from the prior art, longitudinal and transverse channels can be provided for forming joints, for example to enable a twisting of the spacing knitted fabric for the purpose of contour fitting. However, the channel is then compressed and is no longer available for fluid transport.

DE 199 31 193 C2 discloses a spacing knitted fabric for upholstery, which comprises areas of different air permeability. In the case of a uniform structure of the spacing threads, a different density of the material must be achieved, which involves significant constructional effort. In order to design one of the knitted fabric layers to be impermeable to air, this can be provided with a foil. Alternatively, it is also possible to incorporate a melt fibre and then to melt this to form a closed layer. Targeted control of air within the spacing knitted fabric by the formation of continuous channels has not been described, and also it runs counter to the production of a locally variable air permeability.

Documents DE 10 2006 004 914 B4 and DE 10 2009 013 253 A1 disclose the use of threads that melt under the application of heat between the two flat knitted fabric layers of a spacing knitted fabric.

According to DE 10 2006 004 914 B4 a reinforcement of the material is to be obtained by the spacing threads being partly fused together. By means of these measures the compressive strength of the spacing knitted fabric is increased, while the elasticity in the production direction as well as in the transverse direction remains high.

According to DE 10 2009 013 253 A1 an additional layer is provided between the two knitted fabric layers, which extends only over a part of the distance between the knitted fabric layers and therefore enables a two-stage elastic behaviour.

The fact that the spacing knitted fabric can to a certain extent be weakened by the formation of channels is not the only problem affecting the known spacing knitted fabrics. A further disadvantage is that, even without channels between the knitted fabric layers, the known spacing knitted fabrics exhibit a certain amount of elasticity in the plane—thus normally both in the production direction as well as the transverse direction. When cutting to size, the resulting expansion must be allowed for accordingly. In addition, when a spacing knitted fabric is cut to size, short loops can also occasionally be cut off, which then detach themselves from the cutting and contaminate the environment. If the spacing knitted fabric is only cut to size at a customer's premises immediately before the subsequent processing, the contamination described must be dealt with there.

SUMMARY OF THE INVENTION

An object of the present invention is to reduce the above described disadvantages. In particular, a spacing knitted fabric is specified which can be handled more easily during further processing and in particular, also has a reduced elasticity in the longitudinal and transverse directions. Finally, a method for producing the spacing knitted fabric also is specified.

On the basis of a spacing knitted fabric with the features described above, it is provided according to the invention that in the first knitted fabric layer only the additional threads are at least partially melted and due to the at least partial melting, cause a reinforcement of the first knitted fabric layer.

It goes without saying that the present invention relates to a spacing knitted fabric in which the additional threads are first melted and then solidified again by a cooling process.

The melting leads to a clearly noticeable change in the structure of the additional threads. Along the individual additional threads the melting and subsequent solidification can be identified in particular by an non-uniform structure. If, according to a preferred configuration of the invention the additional threads are formed from a multi-filament yarn comprising a plurality of filaments, the filaments are at least partly fused together.

While such a multi-filament yarn can initially be processed and angled very easily, then due to a fusion of the individual filaments a rigid structure is produced in the manner of a strand, with an increased diameter compared to the individual filaments.

Normally however, in spite of the melting the structure of individual threads is preserved, even if these are fused together. In other words, the additional threads are still easily identifiable retrospectively.

In the context of the invention however, this is not absolutely necessary. The spacing knitted fabric can also be heated up—either inadvertently or deliberately—until the additional threads then become molten and largely or completely lose their structure. The material of the additional threads is then distributed in the form of threads in the manner of a melting adhesive introduced into the first knitted fabric layer.

In accordance with the invention however, the mesh structure of the loop threads is maintained even then. The risk of loss of structure in the event of inaccurate process management, in particular in the event of excessive heating of the spacing knitted fabric, is thus considerably reduced.

By means of the thickness, the quantity and the material of the additional threads, the degree of reinforcement can be precisely adjusted.

Since the loop threads themselves are not melted, a reinforcement is indeed obtained, but the loop threads are maintained in their original structure. In contrast to a complete melting of all the threads of the first knitted fabric layer, a certain soft textile-like character is preserved.

Due to the at least partial melting of the additional threads the spacing knitted fabric is indeed stabilized in the plane, however, at the same time the material does not become too hard, which means any noises that occur when deforming the spacing knitted fabric, such as a crackling sound, can also be prevented or at least largely prevented.

With regard to the reinforcement of the first knitted fabric layer and thus also of the entire spacing knitted fabric, different effects can each contribute to this individually, or preferably in combination with each other.

Thus it is possible in particular, that in the first knitted fabric layer the loop threads have not even melted, but are bonded together by the at least partially melted additional threads. The structure of the loop threads is then inherently preserved, but a certain degree of fixing is caused by the melted additional threads. The melted additional threads can contribute to the fixing both by a material positive connection and by a certain amount of positive fitting.

In accordance with a further aspect, the reinforcement can additionally or alternatively be attributed to the fact that the additional threads are formed from a multi-filament yarn comprising a plurality of filaments, wherein the filaments are at least partially fused together.

The loop threads are also preferably formed from multi-filament yarn, so that on the one hand a relatively soft structure then results, and on the other hand the thermoplastic plastic of the melted additional threads can also penetrate to a certain extent between the filaments of the loop threads, which have not themselves melted.

As previously described, the controlled melting of just the additional threads enables a controlled reinforcement of the first knitted fabric layer to be obtained, and given an appropriate design, possibly of the second knitted fabric layer as well.

A further advantage is that, when cutting the spacing knitted fabric to size, due to the additional fastening as a result of the at least partially melted additional threads, no or at least fewer fragments will be released. Contamination of the environment due to cutting is thereby avoided, or at least significantly reduced, but with the first knitted fabric layer still retaining a relatively soft character.

Against this background in particular, in the context of the invention it can also be provided that the second knitted fabric layer also comprises mesh-forming loop threads made from thermoplastic plastic and non-mesh-forming additional threads made of thermoplastic plastic, wherein in the second knitted fabric layer only the additional threads are at least partially melted and due to the at least partial melting, cause a reinforcement of the second knitted fabric layer.

The additional threads in the first and optionally also in the second knitted fabric layer can be incorporated as a partial weft. A partial weft in the context of the invention designates a thread which is guided in the transverse direction across multiple needles during the knitting process, without forming loops itself. View from above, such a partial weft therefore runs in a zig-zag pattern in the production direction.

Depending on the manufacturing process and the knitting machine, the additional threads can also be incorporated as a full weft, so that they then extend exactly perpendicular to the production direction in the individual rows of loops. Finally, the additional threads can also be incorporated either as filler threads or as lining threads running substantially straight in the production direction, wherein in principle different designs of additional threads can also be combined in one knitted fabric layer, for example to form a kind of lattice.

In order to ensure that only the additional threads are at least partially melted in the production of the spacing knitted fabric, the additional threads can be formed from a first thermoplastic polymer and the loop threads from a second thermoplastic polymer, the first thermoplastic polymer having a lower melting or softening temperature than the second thermoplastic polymer.

In thermoplastic plastics it is important to note that the melting or softening temperature cannot often be accurately specified, because there is no clear phase transition. The described temperature difference is expressed at least in the fact that at a suitable temperature, the at least partial melting of the additional threads causes an observable structural change, while the loop threads exhibit no or no substantial observable structural change.

A conventional finishing of the material, in which the loop threads are not melted but only fixed in their shape as a result of the reduction of their resetting properties, is not understood on its own to be a structural change in the context of the invention.

As an alternative to a uniform heating of the spacing knitted fabric for selectively melting the additional threads, it can also be provided that the additional threads absorb irradiated energy, for example in the form of infrared or microwave radiation, more strongly so that only the additional threads are intentionally strongly heated. The additional threads can also be mixed with an additive which increases the absorption of the relevant radiation. When using infrared heating, for example, a dark shading of the additional threads may already be enough to selectively obtain a strong heating.

In accordance with a preferred configuration of the invention it is provided that the at least one knitted fabric layer comprises openings formed of multiple loops. The openings provide a particularly open, air-permeable structure, wherein the openings are often in the shape of a honeycomb, for example. Spacing knitted fabrics with a corresponding structure are known, for example from DE 10 2008 020 287 C5.

In addition, channels can be formed between the knitted fabric layers, which are free of spacing threads. Such channels improve the air permeability, and depending on the specific application may also be provided as a kind of pre-determined breaking point. While in conventional spacing knitted fabrics, the channels that remain free constitute a weakness where the material can easily collapse, it is precisely the at least partial melting of the additional threads that can result in a certain stabilisation in the area of the channels.

Even when stressed at specific points the channels collapse less severely, which is why the reinforcement of at least the first knitted fabric layer and possibly also of the second knitted fabric layer enables a distribution of the forces acting over a fairly large area.

The spacing knitted fabric can be used, for example, for upholstering a vehicle seat, a mattress or the like.

As explained earlier, the degree of reinforcement can be controlled by the material selection, the proportion and the knitted pattern of the additional threads. Preferably, the first knitted fabric layer and, in the case of an appropriate structure, the second knitted fabric layer as well, mainly consist of the loop threads. In particular, the weight ratio of all additional threads of the first knitted fabric layer to all the loop threads of the first knitted fabric layer can be between 1:1 and 1:10, and in particular 1:2 and 1:8.

As explained earlier, a multi-filament yarn is preferably used for the additional thread, the appropriate filaments then advantageously consisting of a uniform polymer material. It is also conceivable to use a bi-component mono-filament yarn or a multi-filament yarn, wherein in addition, a multi-filament yarn can also comprise filaments of different compositions. It is then possible that by selection of a suitable material only one of the different polymer components will melt, while the other polymer component can securely maintain the structure of the additional threads, so that the additional threads are always prevented from completely melting to destruction.

Different laying patterns can be provided for the loop threads. For example, the loop threads can be arranged in a fringed laying pattern, wherein other laying patterns such as tricot, cloth, twill, atlas or the like come into consideration.

For the material of the spacing knitted fabric, for example, polyester can be provided. In particular, in accordance with a preferred configuration of the invention, it is provided that the loop threads and the additional threads of the first knitted fabric layer, and where appropriate the second knitted fabric layer also, are formed from different types of polyester, in particular polyethylene terephthalate (PET), wherein the result obtained by the previously mentioned measures in production is that only the additional threads are melted and subsequently solidified again.

In the knitting process the first knitted fabric layer, the second knitted fabric layer and the spacing threads between them are formed with multiple rows of needles, each with a plurality of parallel guided threads, wherein stitch wales or warp strands extending in the production direction are formed, as well as rows of loops which are consecutive in the production direction and extending in the transverse direction.

In accordance with a preferred configuration of the invention, channels are provided at least along the production direction, which can be generated in a particularly simple manner by the omission of spacing threads. In particular, the channels can be formed in a uniform grid, in each case by omitting at least one spacing thread extending in the production direction. For example, it is possible to leave out every second, every third, every fourth or every fifth spacing thread in order to create a channel there. In addition or as an alternative, channels can also be formed in the transverse direction by the spacing threads being guided in the production direction on rows of loops spaced apart from each other, preferably also in a regular grid, in one of the two knitted fabric layers.

The arrangement of the longitudinal or transverse channels in a fixed grid with a constant spacing between the channels and a constant channel width is not mandatory, however.

It is easily possible, both with long channels and transverse channels, to vary the width of the channels and the distance from channel to channel. For example, to produce a larger channel width with longitudinal channels, two or more consecutive spacing threads in the transverse direction can be omitted. The distance between two longitudinal channels on the other hand is determined by the number of spacing threads arranged between them. The use of such a variation first of all offers the facility to adjust the mechanical properties of the spacing knitted fabric even more precisely. Furthermore, the possibility also exists of adapting the spacing knitted fabric even more precisely to its subsequent application. Thus it is conceivable, for example, that in some regions of the spacing knitted fabric it is advantageous to have a greater hardness and in other areas a greater degree of ventilation, wherein these requirements can be satisfied by providing a customized arrangement and design of the channels. Where necessary, when separating individual sections from the spacing knitted fabric, a pattern repeat and an orientation must be taken into account.

Accordingly, the channel width and the distance between two consecutive channels in the transverse direction can be varied almost arbitrarily in the case of longitudinal channels. The same applies to the design of transverse channels. In principle though, a recurring sequence of a varying channel width or a varying channel spacing over a certain interval in the transverse direction or longitudinal direction is also possible.

The present invention preferably relates to a spacing knitted fabric in which the first knitted fabric layer comprises openings which are each formed of multiple loops. During the knitting process, successive loops are formed one after another in the production direction that proceed sequentially along the rows of loops in the transverse direction. The openings represent a structuring which extends over several loops, at least in the production direction.

In a preferred configuration of the invention the second knitted fabric layer can also have openings.

The openings of the first and the second knitted fabric layer are arranged by a finishing process of the spacing knitted fabric, that is to say by means of an alignment of the spacing knitted fabric under tension and under the application of heat, such that in a plan view of the spacing knitted fabric the openings of the first knitted fabric layer and the openings of the second knitted fabric layer are arranged one above the other or are preferably staggered relative to one another.

In the context of the invention it may be provided that the additional threads are melted immediately after the production process, so that a heating process takes place in a similar way to a standard finishing operation. The melting is then achieved by a selective heating of the additional threads and/or by a low melting point below the temperature prescribed for the finishing process. As part of such a configuration a substantially uniform structure is then preferably obtained over the entire surface of the spacing knitted fabric with regard to the additional threads.

But it is also possible not to effect the melting of the additional threads until later, or to melt the additional threads again by a suitable application of temperature, to change the shape of the spacing knitted fabric.

Thus it is possible, for example, in a first heating of the additional threads until they melt or in a second melting of the additional threads, to introduce the spacing knitted fabric or a section of the spacing knitted fabric into a mould in which a three-dimensional shape is defined. This then also results in the advantages described earlier in connection with the dimensional stability of the spacing knitted fabric. Due to the at least partially melted additional threads, the specified three-dimensional structure can be maintained after a cooling phase and removal from a mould. However, the spacing knitted fabric overall remains relatively soft and also to a certain extent, pliable. The at least partially melted additional threads then form a kind of basic structure within the inherently soft and elastic spacing knitted fabric, which defines the three-dimensional shape. By providing the spacing knitted fabric as a uniform material which is relatively easily formed, a good formability can be combined with relatively soft and elastic properties at the same time. Regardless of whether the melting of the additional threads takes place in a flat knitted fabric or within a mould, the material remains relatively flexible and in particular is also pliable, so that in further processing it can undergo a shape adjustment. For example, the spacing knitted fabric according to the invention can also be arranged in an S-shape.

In the context of the invention, the entire first knitted fabric layer and possibly also the second knitted fabric layer may be formed completely from the mesh-forming loop threads and the non-mesh-forming additional threads. As part of an alternative configuration however, it is also possible to provide non-mesh-forming tearing threads as a third type of thread. The integration of non-mesh-forming tearing threads is particularly advantageous if channels are formed between the knitted fabric layers, which are free of spacing threads. The mesh-forming tearing thread can then be provided in at least part of the channels, so that the corresponding knitted fabric layer can then be separated along the corresponding channels by tearing apart the tearing threads. If, in accordance with a preferred configuration of the invention, tearing threads are provided in each of the two knitted fabric layers on part of the channels, then the spacing knitted fabric can easily be torn into strips, enabling a wide material web of the spacing knitted fabric to be easily cut up into small pieces of a specified width.

To this end, the tearing threads preferably extend along the corresponding channels in a zigzag pattern as the only connection between adjacent stitch wales of the mesh-forming loop threads.

The non-mesh-forming additional threads and the non-mesh-forming tearing threads can be processed in an identical laying pattern. All that is then required in the production process is to ensure that at the desired separation points the non-mesh-forming additional thread is replaced by a tearing thread.

The tearing thread advantageously has a low fineness level, so for this reason thin multi-filament yarns are particularly suitable for the tearing threads.

The subject matter of the invention is also a method for producing a spacing knitted fabric comprising the steps:
creation of a knitted fabric web by knitting a first knitted fabric layer, a second knitted fabric layer and spacing threads between the first and second knitted fabric layer in such a way that the first knitted fabric layer has mesh-forming loop threads and non-mesh-forming additional threads, wherein the additional threads comprise a first thermoplastic polymer which preferably has a lower melting temperature or softening temperature than a second thermoplastic polymer, from which the loop threads are formed;
heating of the knitted fabric web in such a way that in the first knitted fabric layer, only the additional threads are at least partially melted;
reinforcement of the first knitted fabric layer by cooling of the knitted fabric web.

The spacing knitted fabric can then be detached from the knitted fabric web as a cutting for further processing.

This results in the advantage that, due to the reinforcement by the additional threads the expansion in the production and transverse directions is substantially lower, so that after cutting to size under tension, no significant shrinkage needs to be allowed for. Despite this reinforcement, due to the additional threads the entire spacing knitted fabric remains relatively soft, so that the reinforcement described can be provided in both of the knitted fabric layers. Another advantage obtained is that, when the spacing knitted fabric is separated from the knitted fabric web, less waste is produced in the form of loose fragments.

BRIEF DESCRIPTION OF THE DRAWINGS

The invention is explained in the following section by reference to the drawings, which represent at least one exemplary embodiment. Shown are.

DETAILED DESCRIPTION OF THE INVENTION

Figure 1:
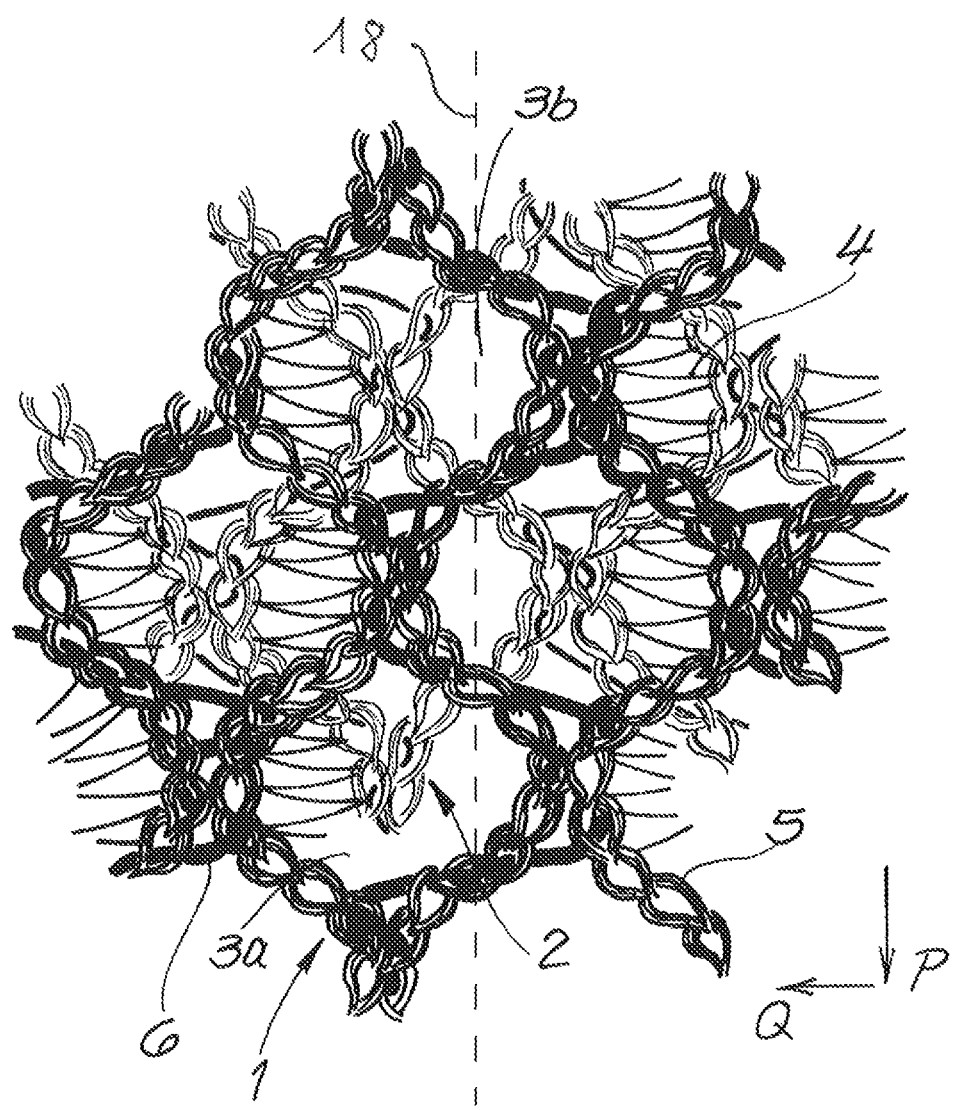
FIG. 1 a section of a spacing knitted fabric in a plan view.

FIG. 1 shows a plan view of a spacing knitted fabric comprising a first flat knitted fabric layer 1, shown above in the drawing, and a second knitted fabric layer 2 arranged underneath it.

Both the first knitted fabric layer 1 and the second knitted fabric layer 2 each have openings 3a, 3b, which are formed by a plurality of loops in the knitting process. In FIG. 1 it can be seen that the first knitted fabric layer 1 and the second knitted fabric layer 2 are connected to each other by spacing threads 4.

In the production of the spacing knitted fabric, rows of loops running in the transverse direction Q are formed sequentially in a production direction P.

Figure 2:
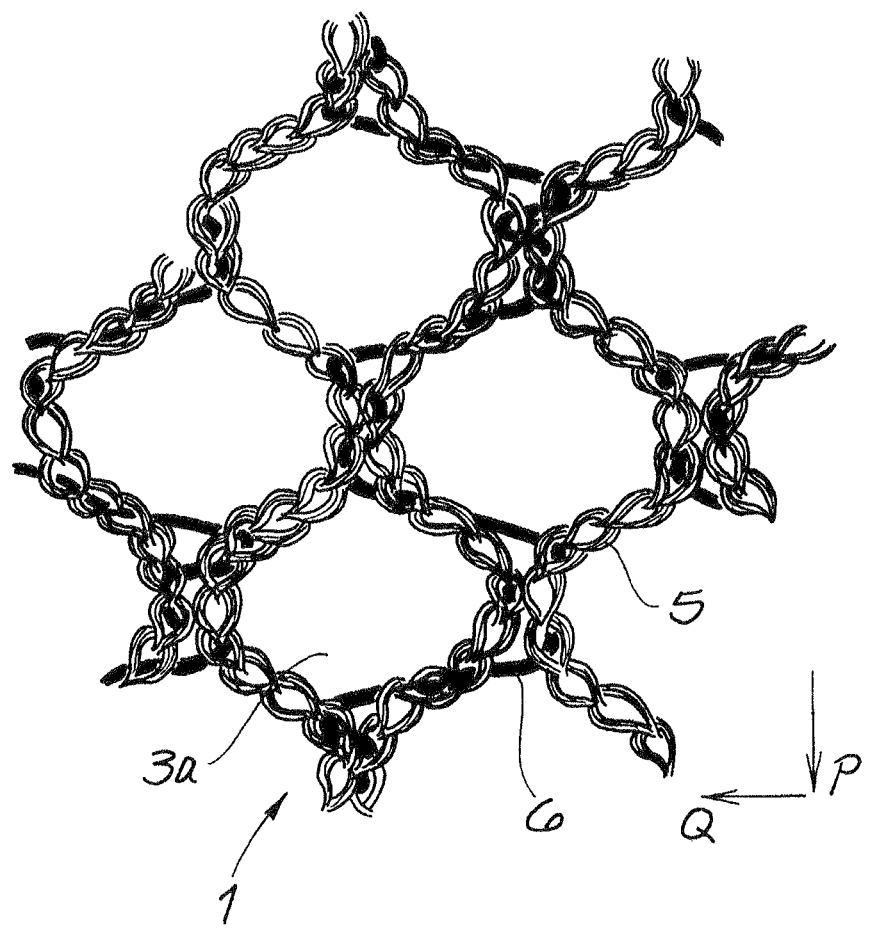
FIG. 2 a first knitted fabric layer of the spacing knitted fabric alone, in a plan view, FIG. 3 a variant of the spacing knitted fabric as shown in FIG. 1 in an abstract representation.

FIG. 2 shows a detail of the first knitted fabric layer 1, wherein for better visibility the second knitted fabric layer 2 and the spacing threads 4 are not shown. In particular, in the context of the invention the first knitted fabric layer 1 and the second knitted fabric layer 2 can be formed identically or substantially identically.

From FIG. 2 it can be seen that the first knitted fabric layer 1, and therefore preferably also the second knitted fabric layer 2, has both mesh-forming loop threads 5 and non-mesh-forming additional threads 6.

The additional threads 6 are shown thicker for better visibility, wherein these do not need to correspond to the actual thread thickness in practice, however.

According to the invention the additional threads 6 are partially melted and solidified again, which reinforces the first knitted fabric layer 1.

The additional threads 6 are preferably formed of multi-filament yarns, wherein the individual filaments can be connected to each other in the at least partial melting process. In addition, the melted additional threads 6 can also bond and fix the loop threads 5 to a certain extent. The loop threads 5 nevertheless retain their original structure, so that the first knitted fabric layer 1 is reinforced but does not become completely hard.

Both the melting of the individual filaments of the additional threads 6 together and a certain amount of bonding of the loop threads 5 can contribute to the reinforcement of the first knitted fabric layer 1, and in an appropriate configuration, of the second knitted fabric layer 2 also.

During processing of the spacing knitted fabric a small expansion is produced in the production direction P and in the transverse direction Q, which facilitates the processing. Individual fragments of the spacing threads 4 or of the loop threads 5 can be fixed to a certain extent by the melted additional threads 6, so that fragments such as these are not released when the spacing knitted fabric is cut to size.

FIG. 3 shows a variant of the spacing knitted fabric shown in FIG. 1 in an abstract representation. In accordance with FIG. 1, the first knitted fabric layer, and optionally also the second knitted fabric layer, is formed from the mesh-forming loop threads 5 and the non-mesh-forming additional threads 6. FIG. 3 now shows a variant of this, in which on the basis of a uniform arrangement of the non-mesh-forming additional threads 6, individual additional threads 6 are displaced by non-mesh-forming tearing threads 7 in a specified pattern along the transverse direction Q. The first knitted fabric layer 1 can then be easily separated at the non-mesh-forming tearing threads 7. The non-mesh-forming tearing threads 7, in contrast to the non-mesh-forming additional threads 6, are not melted and have a lower tear strength. Advantageously, in each of the two knitted fabric layers 1, 2 a non-mesh-forming tearing thread 7 is provided at the same position in the transverse direction, one above the other.

The non-mesh forming tearing threads 7 then extend particularly preferably along a longitudinal channel 18 on which the spacing threads 4 are also omitted. The entire spacing knitted fabric can then be torn into strips along these channels.

What is claimed is:

1. A spacing knitted fabric, comprising:
a first knitted fabric layer: and
a second flat knitted fabric layer;
wherein the first and second knitted fabric layers are connected to each other by incorporated spacing threads;
wherein the first knitted fabric layer has loop-forming loop threads and non-loop forming additional threads, wherein the non-loop forming additional threads are made of a first thermoplastic polymer and the loop-forming loop threads are made of a second thermoplastic polymer;
wherein in the first knitted fabric layer, only the non-loop forming additional threads are partially melted while the loop-forming loop threads remain unmelted, and due to the partial melting, the non-loop forming additional threads reinforce the first knitted fabric layer such that the partially melted non-loop forming additional threads bond and fix the loop-forming loop threads together due to the partial melting while a structure of the loop threads stays unchanged,
wherein the non-loop-forming additional threads are formed from multi-filament yarn comprising a plurality of filaments that are partially fused together in the manner of a strand due to the partial melting,
wherein the first thermoplastic polymer has a lower melting or softening temperature than the second thermoplastic polymer, and
wherein at least one of the first and the second knitted fabric layers comprises openings formed by a plurality of loops.

2. The spacing knitted fabric according to claim 1, wherein in the first knitted fabric layer, the loop-forming loop threads are bonded together by the at least partially melted non-loop forming additional threads.

3. The spacing knitted fabric according to claim 1, wherein the second knitted fabric layer also comprises loop-forming loop threads made of a second thermoplastic polymer and non-loop forming additional threads made of a first thermoplastic polymer; and wherein in the second knitted fabric layer, only the non-loop forming additional threads are at least partially melted and due to the at least partial melting, reinforce the second knitted fabric layer.

4. The spacing knitted fabric according to claim 3, wherein the non-loop forming additional threads are incorporated into the respective knitted fabric layer as a continuous weft or partial weft thread.

5. The spacing knitted fabric according to claim 1, wherein channels that are free of spacing threads are formed between the first and the second knitted fabric layers.

6. The spacing knitted fabric according to claim 1, wherein in the first knitted fabric layer, a the weight ratio of the non-loop forming additional threads to the loop-forming loop threads is between 1:1 and 1:10.

7. The spacing knitted fabric according to claim 1, wherein the loop-forming loop threads and the non-loop forming additional threads of the first knitted fabric layer are formed from different types of polyester.

8. The spacing knitted fabric according to claim 7, wherein at least one of the different types of polyester comprises polyethylene terephthalate (PET).

* * * * *